(12) United States Patent
Yoneda

(10) Patent No.: US 8,910,519 B2
(45) Date of Patent: Dec. 16, 2014

(54) VIBRATION GYRO ELEMENT

(75) Inventor: Toshimaro Yoneda, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 372 days.

(21) Appl. No.: 13/343,748

(22) Filed: Jan. 5, 2012

(65) Prior Publication Data

US 2012/0096941 A1 Apr. 26, 2012

Related U.S. Application Data

(63) Continuation of application No. PCT/JP2010/059652, filed on Jun. 8, 2010.

(30) Foreign Application Priority Data

Jul. 7, 2009 (JP) ................................ 2009-160490

(51) Int. Cl.
*G01C 19/56* (2012.01)
*G01C 19/5656* (2012.01)

(52) U.S. Cl.
CPC .................................. *G01C 19/5656* (2013.01)
USPC ..................................................... 73/504.12

(58) Field of Classification Search
CPC ....... G01P 15/18; G01P 15/097; F02G 1/044; F02G 1/0445; H03H 9/02559
USPC ..................................................... 73/504.12
See application file for complete search history.

(56) References Cited

U.S. PATENT DOCUMENTS 6,539,804 B1 * 4/2003 Iwata ........................ 73/504.13

FOREIGN PATENT DOCUMENTS

| JP | 3218702 | 1/1994 |
|---|---|---|
| JP | 11-281363 A | 10/1999 |
| JP | 2007-212355 A | 8/2007 |
| JP | 2007-27149 A | 10/2007 |
| JP | 2007-271497 A | 10/2007 |
| JP | 2009-074996 A | 4/2009 |

OTHER PUBLICATIONS

Konno, M., "Piezoelectric Vibratory Gyroscope," The Journal of the Acoustical Society of Japan, vol. 45, No. 5, pp. 402-408, 1989.
Konno, et al., "Angular Rate Sensor of Piezoelectric Vibratory Gyroscope," The Journal of the Institute of Electronics, Information and Communication Engineers, vol. J78-C-I, No. 11, pp. 547-556, Nov. 1995.

(Continued)

*Primary Examiner* — Hezron E Williams
*Assistant Examiner* — Gregory J Redmann
(74) *Attorney, Agent, or Firm* — Dickstein Shapiro LLP

(57) ABSTRACT

A vibration gyro element that includes a piezoelectric substrate configured to have a shape that is line-symmetrical about each of the two detection axes $X_1$ and $X_2$ which are parallel to a principal surface and orthogonal to each other; and a plurality of pairs of principal surface electrodes which are provided on front and back principal surfaces of the piezoelectric substrate. The piezoelectric substrate is formed from a monocrystal classified into the trigonal system 3m point group, and a crystal axis X of a crystal coordinate system (X, Y, Z) coincides with an axis that equally divides between the two detection axes $X_1$ and $X_2$.

7 Claims, 8 Drawing Sheets

(56) References Cited

OTHER PUBLICATIONS

Wakatsuki, N., "Electromechanical Devices Using LiNbO$_3$ and LiTaO$_3$ Piezoelectric Crystals" The Journal of the Institute of Electronics, Information and Communication Engineers, vol. J87-C, No. 2, pp. 216-224, Feb. 2004.
PCT/JP2010/059652 Written Opinion dated Jul. 13, 2010.
PCT/JP2010/059652 International Search Report dated Jul. 13, 2010.

* cited by examiner

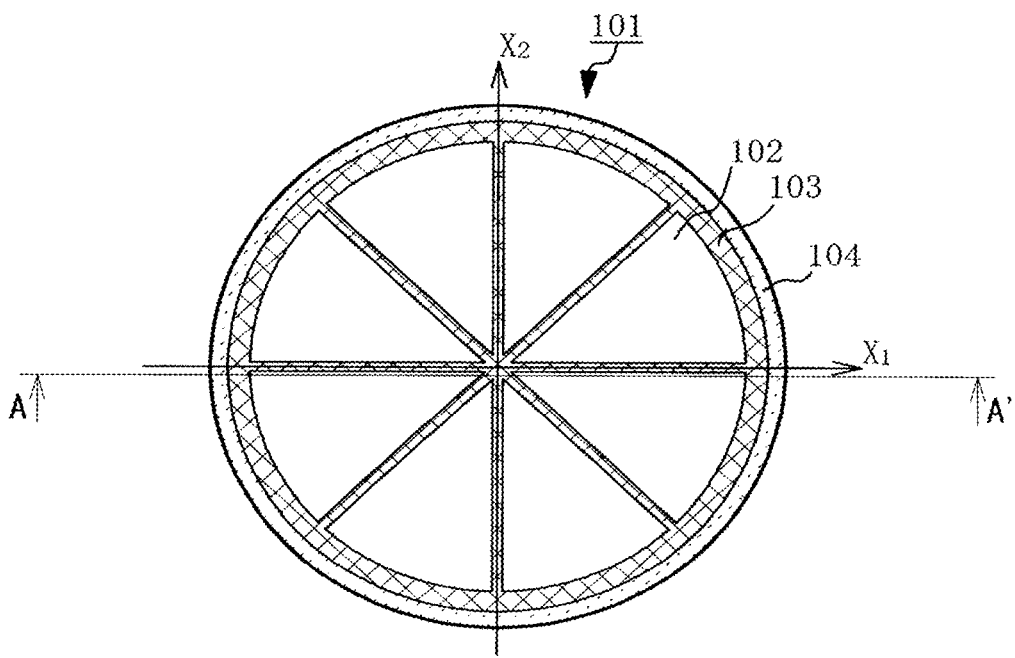
FIG. 1(A) PRIOR ART
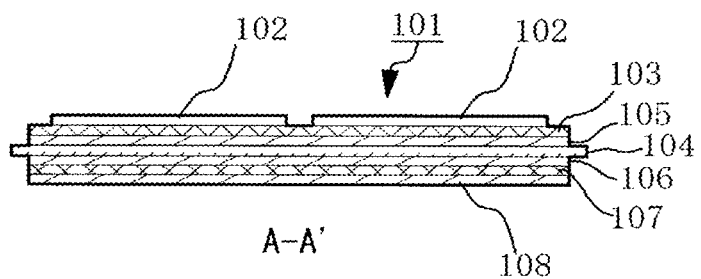
FIG. 1(B) - PRIOR ART

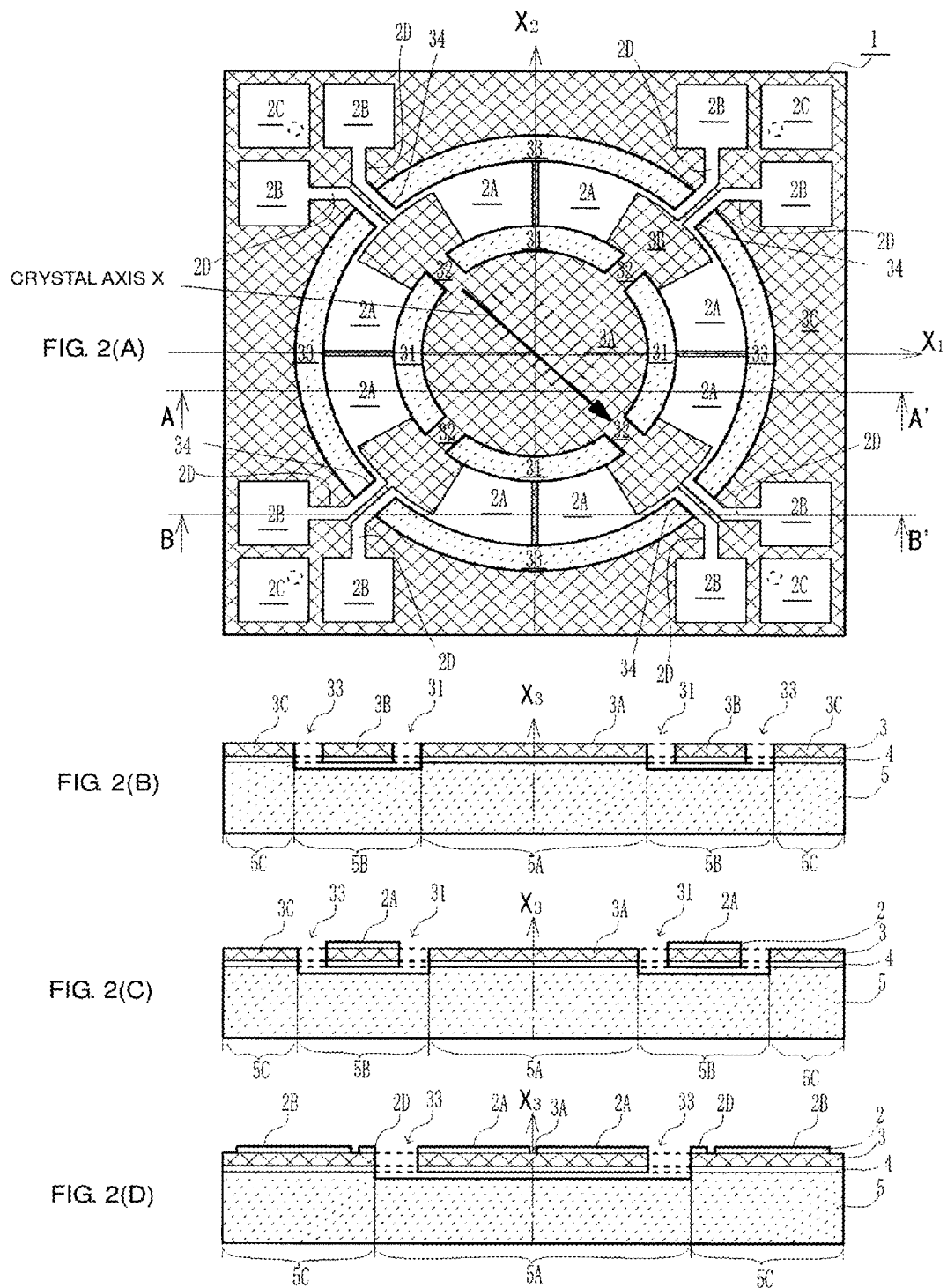

VIBRATION GYRO ELEMENT

CROSS REFERENCE TO RELATED APPLICATIONS

The present application is a continuation of International application No. PCT/JP2010/059652, filed Jun. 8, 2010, which claims priority to Japanese Patent Application No. 2009-160490, filed Jul. 7, 2009, the entire contents of each of which are incorporated herein by reference.

FIELD OF THE INVENTION

The invention relates to a vibration gyro element which flexurally vibrates a vibration body in a direction perpendicular to a principal surface and detects rotation of the vibration body from a Coriolis force applied in a direction parallel to a principal surface of the vibration body.

BACKGROUND OF THE INVENTION

A vibration gyro element uses, as a vibration body, a piezoelectric monocrystal, such as quartz crystal, lithium niobate, or lithium tantalite, or a vibration plate to which a piezoelectric monocrystal is attached. Shapes of vibration bodies are various shapes such as a tuning fork shape, a square cross-sectional turning bar shape, an equilateral triangular cross-sectional turning bar shape, a circular cross-sectional turning bar shape, and an H shape (e.g., see Non-Patent Literatures 1 to 3 and Patent Literature 1).

Each of the vibration gyro elements described in Non-Patent Literatures 1 to 3 has one detection axis for detecting rotation. Thus, in order to detect rotation about a plurality of detection axes, a plurality of elements are needed. Meanwhile, the vibration gyro element described in Patent Literature 1 has a plurality of detection axes.

FIGS. 1(A) and 1(B) are diagrams illustrating a configuration example of a vibration gyro element obtained by referring to Patent Literature 1. FIG. 1(B) is a cross-section along line A-A' in FIG. 1(A).

The vibration gyro element 101 includes a vibration plate 104, eight detection vibration bodies, and one drive vibration body. The drive vibration body includes a driving electrode 106, a piezoelectric substrate 107, and a driving electrode 108, and excites the vibration plate 104 to flexurally vibrate in a principal surface normal direction. Each detection vibration body includes a detecting electrode 102, a piezoelectric substrate 103, and a detecting electrode 105.

In the vibration gyro element 101, each detection vibration body is located so as to be symmetrical about each of two orthogonal detection axes ($X_1$ axis, $X_2$ axis). In a pair of detection vibration bodies located so as to face each other across a detection axis, in-phase alternating voltages are excited when a Coriolis force is not applied to the vibration plate 104, and the phase of an alternating voltage changes by an amount of change of reversed polarity when a Coriolis force is applied to the vibration plate 104. Thus, the difference between the alternating voltages excited in the pair of detection vibration bodies is obtained with a detection circuit, whereby it is possible to detect a Coriolis force generated by rotation about the detection axis sandwiched between these vibration bodies.

In a vibration gyro element having a plurality of detection axes, when a driving characteristic and a detection characteristic are similar for each detection axis, even if a detection circuit which detects rotation about each detection axis has the same circuit configuration, the detection circuit can detect rotation about each detection axis. The driving characteristic is a characteristic regarding the distribution of amplitude of flexural vibrations, and the detection characteristic is a characteristic regarding the distribution of amplitude of an excitation voltage.

Non Patent Literature 1: "Piezoelectric Vibratory Gyroscope," The Journal of the Acoustical Society of Japan, vol. 45, No. 5, pp. 402-408, 1989.

Non Patent Literature 2: "Angular Rate Sensor of Piezoelectric Vibratory Gyroscope," The Journal of the Institute of Electronics, Information and Communication Engineers, Vol. J78-C-I, No. 11, pp. 547-556, November 1995.

Non Patent Literature 3: "Electromechanical Devices Using $LiNbO_3$ and $LiTaO_3$ Piezoelectric Crystals" the Journal of the Institute of Electronics, Information and Communication Engineers, Vol. J87-C, No. 2, pp. 216-224, February 2004.

Patent Literature 1: Japanese Patent No. 3218702

SUMMARY OF THE INVENTION

The driving characteristic and the detection characteristic of each detection axis have temperature dependency, and when the environmental temperature is out of a moveable temperature range, the similarities of the driving characteristic and the detection characteristic for each detection axis are lost. Even if the similarities of the driving characteristic and the detection characteristic for each detection axis are lost, it is possible to maintain the similarity of the excitation voltage by performing compensation with the detection circuit corresponding to each detection axis. However, in this case, a problem arises that the circuit configuration as a whole of the vibration gyro element is complicated.

As a result of thorough research, the inventor of the present application has obtained findings that the loss of the similarities in driving characteristic and detection characteristic depends on the difference in linear expansion coefficient between a piezoelectric substrate and an electrode, and has conceived the technical idea of the invention of the present application.

It is an object of the present invention to provide a vibration gyro element which can ensure a wide moveable temperature range even when a detection circuit corresponding to each detection axis has the same circuit configuration.

A vibration gyro element of the invention includes: a piezoelectric substrate configured to have a shape that is line-symmetrical about each of two detection axes which are parallel to a principal surface and orthogonal to each other; and a plurality of pairs of principal surface electrodes provided on front and back principal surfaces of the piezoelectric substrate. A frequency signal is applied between at least one of the pairs of principal surface electrodes to vibrate the piezoelectric substrate in a principal surface normal direction. In addition, a Coriolis force applied to the piezoelectric substrate by rotation about each detection axis is detected on the basis of a voltage excited in at least one of the pairs of principal surface electrodes. The piezoelectric substrate is formed from a monocrystal classified into a trigonal system 3m point group, and a crystal axis X of a crystal coordinate system (X, Y, Z) is made to coincide with any of axes each of which equally divides between two detection axes.

The piezoelectric substrate and the pairs of principal surface electrodes are different from each other in linear expansion coefficient, and thus distortion occurs in the piezoelectric substrate by thermal stress being applied. The distribution of the distortion is symmetrical about a crystal axis X in the monocrystal classified into the trigonal system 3m point group. Therefore, when the crystal axis X is made to coincide with the axis that equally divides between the two detection axes, the distribution of distortion of the piezoelectric substrate which occurs on each detection axis in the piezoelectric substrate can be close to symmetry. Due to this, even when distortion of the piezoelectric substrate occurs on each detection axis due to change of the environmental temperature, similarities of a driving characteristic and a detection characteristic for each detection axis can be maintained.

Preferably, the piezoelectric substrate of the invention includes a frame-shaped vibration portion and a support beam which supports the vibration portion, and the support beam is provided so as to extend along an axis that equally divides between the two detection axes. The position where the vibration portion is supported by the support beam is the node of flexural vibrations, and the position of the vibration portion on the detection axis is the loop of the flexural vibrations. Therefore, the amplitude of the flexural vibrations of the vibration portion can be maximized on the detection axis, and hence the detection sensitivity is increased. In addition, due to the configuration in which the frame-shaped vibration portion is supported by the support beam, the flexural vibrations of the vibration portion can fully be supported without restricting the vibrations, and hence similarity in linear expansion coefficient difference for each detection axis can be ensured. Therefore, an ideal vibration form can be implemented.

Preferably, the vibration gyro element of the invention further includes a support substrate which is formed from a monocrystal classified into the trigonal system 3m point group and in which the crystal axis X of the crystal coordinate system (X, Y, Z) coincides with the axis that equally divides between the two detection axes, and the support substrate supports the piezoelectric substrate. Thus, similarities of a driving characteristic and a detection characteristic for each detection axis are increased.

Preferably, the piezoelectric substrate of the invention: has a characteristic in which when θ of an Euler angle representation in a right-hand system is changed from 0° to 180°, an electromechanical coupling coefficient changes to a first maximum value, a minimum value, and a second maximum value in order, and the second maximum value is greater than the first maximum value; and is configured such that θ of the Euler angle representation in the right-hand system falls within a range where the electromechanical coupling coefficient is greater than the first maximum value. In addition, the piezoelectric substrate of the invention preferably sets θ of the Euler angle representation in the right-hand system, in a range where the electromechanical coupling coefficient is substantially the second maximum value. When the piezoelectric substrate is configured as described above, the electromechanical coupling coefficient is increased and the sensitivity of the vibration gyro element is increased. In addition, even when there is an error in θ, stability of the electromechanical coupling coefficient is improved around an extreme.

Preferably, the piezoelectric substrate of the invention has a characteristic in which when θ of an Euler angle representation in a right-hand system is changed from 0° to 180°, a resonant frequency indicates an extreme and changes, and the piezoelectric substrate is configured such that θ of the Euler angle representation in the right-hand system falls within a range where a resonant frequency is substantially the extreme. Even when there is an error in θ, stability of the electromechanical coupling coefficient is improved around the extreme.

The piezoelectric substrate of the invention is preferably lithium niobate or lithium tantalate. Use of lithium niobate allows the electromechanical coupling coefficient and the Q value to be increased to obtain a good sensitivity characteristic. Use of lithium tantalate allows the balance between the sensitivity and the temperature characteristic to be improved.

According to the invention, the distribution of distortion of the piezoelectric substrate which occurs due to application of thermal stress is symmetrical about the two detection axes, and similarities of a driving characteristic and a detection characteristic based on each of the two detection axes can be ensured in a wide temperature range. Therefore, even when the same circuit configuration is used for a detection circuit that detects rotation about each detection axis, a wide moveable temperature range can be ensured.

BRIEF DESCRIPTION OF THE DRAWINGS

FIGS. 1(A) and 1(B) are diagrams illustrating a configuration example of an existing vibration gyro element.

FIGS. 2(A) to 2(D) are diagrams illustrating a configuration example of a vibration gyro element according to an embodiment of the present invention.

DETAILED DESCRIPTION OF THE INVENTION

Figure 3:
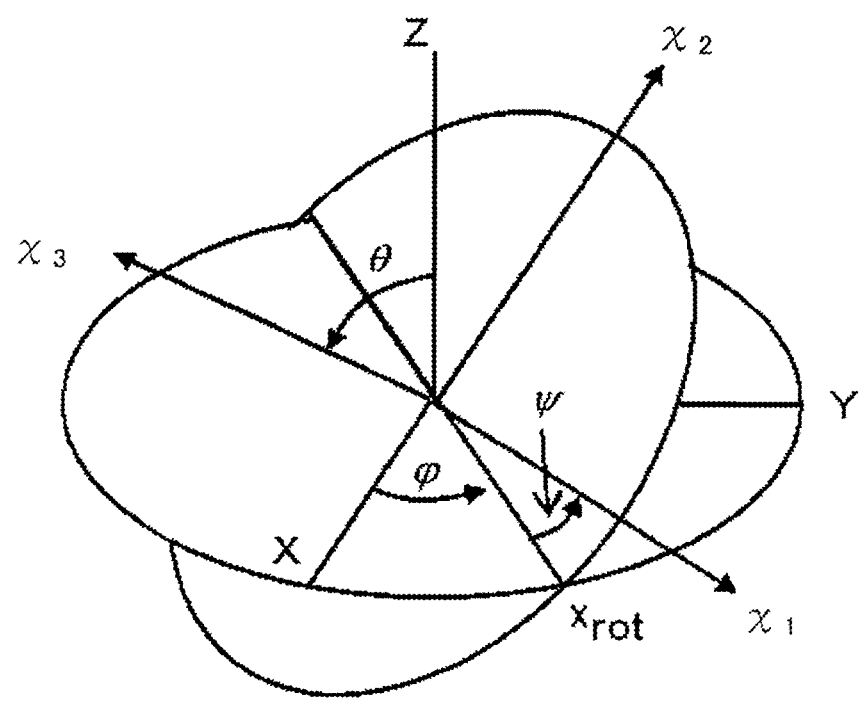
FIG. 3 is a diagram illustrating an Euler angle representation in a right-hand system.

A vibration gyro element according to an embodiment of the present invention will be described.

FIGS. 2(A) to 2(D) are diagrams illustrating a configuration example of the vibration gyro element. FIG. 2(A) is a plan view, FIG. 2(B) is a central cross-sectional view, FIG. 2(C) is an A-A' cross-sectional view, and FIG. 2(D) is a B-B' cross-sectional view.

The vibration gyro element 1 sets orthogonal two axes (an $X_1$ axis and an $X_2$ axis) as detection axes and detects rotation about each detection axis. Thus, the vibration gyro element 1 is configured to have a shape that is line-symmetrical about the $X_1$ axis as a symmetry axis and to have a shape that is line-symmetrical about the $X_2$ axis as a symmetry axis. In addition, the vibration gyro element 1 is configured by laminating a support substrate 5, a lower principal surface electrode 4, a piezoelectric substrate 3, and an upper principal surface electrode 2 in order from below along an $X_3$ axis perpendicular to an $X_1$-$X_2$ plane.

Each of the support substrate 5 and the piezoelectric substrate 3 is a piezoelectric monocrystal substrate of lithium niobate ($LiNbO_3$) or a piezoelectric monocrystal substrate of lithium tantalite ($LiTaO_3$). The support substrate 5 has a thickness of 0.34 mm, and the piezoelectric substrate 3 has a thickness of 1 μm. The lower principal surface electrode 4 is a tungsten (W) electrode having an electrode thickness of 500 nm, and the upper principal surface electrode 2 is an aluminum (Al) electrode. The tungsten electrode has a high melting point, and thus diffusion of the electrode caused by a heat load is suppressed. The tungsten electrode has a high specific gravity and a high specific acoustic impedance, and thus dumping of acoustic wave mechanical vibrations excited in a piezoelectric vibrator is suppressed. The aluminum electrode has a low specific resistance, and thus the series equivalent resistance of the piezoelectric vibrator is suppressed.

The piezoelectric substrate 3 is configured such that the $X_1$-$X_2$ plane is a principal surface in a transformation coordinate system ($X_1$, $X_2$, $X_3$) that is defined by an Euler angle representation ($\phi$, $\theta$, $\psi$)=(0°, 0°, 45°) in a right-hand system based on a crystal coordinate system (X, Y, Z) of the piezoelectric substrate 3. Thus, a crystal axis X coincides with an axis that equally divides between the detection axes $X_1$ and $X_2$ at 45°. FIG. 3 is a diagram illustrating the relation between the Euler angle representation ($\phi$, $\theta$, $\psi$) in the right-hand system and the transformation coordinate system ($X_1$, $X_2$, $X_3$) (e.g., see "Handbook of Acoustic Wave Device Technology", edited by No. 150 Acoustic Wave Device Technology Committee of the Japan Society for the Promotion of Science, Ohmsha, Ltd., 1991; P549).

The piezoelectric substrate 3 is divided into an inner region 3A, a frame-shaped region 3B, and an outer region 3C when the piezoelectric substrate principal surface ($X_1$-$X_2$ plane) is seen from the $X_3$ axis. The frame-shaped region 3B has a circular inner and circular outer frame shape with an inner diameter of 400 μmm and an outer diameter of 500 μm. The inner region 3A has a circular shape having a diameter of 300 μm. The outer region 3C has a circular inner and rectangular outer shape with an inner diameter of 600 μmm. Four inner open holes 31 and four inner beam portions 32 are provided between the inner region 3A and the frame-shaped region 3B, and four outer open holes 33 and four outer beam portions 34 are provided between the outer region 3C and the frame-shaped region 3B. The inner beam portions 32 and the outer beam portions 34 are beam-shaped regions having widths of 20 μm along directions of 45°, 135°, 225°, and 315° based on an $X_1$ axis positive direction in the $X_1$-$X_2$ plane being 0°. These inner beam portions 32 and outer beam portions 34 support the frame-shaped region 3B in a state where the frame-shaped region 3B is located above the support substrate 5.

The lower principal surface electrode 4 is provided in a region which covers at least the frame-shaped region 3B of the lower principal surface of the piezoelectric substrate 3, and is connected to a reference potential. Each drive detection electrode 2A faces the lower principal surface electrode 4 to constitute a pair of principal surface electrodes of the present invention.

The support substrate 5 is divided into an inner region 5A, a vibration region 5B, and an outer region 5C when a support substrate principal surface (the $X_1$-$X_2$ plane) is seen from the $X_3$ axis. The vibration region 5B is a region which has a circular inner and circular outer frame shape with an inner diameter of 300 μmm and an outer diameter of 600 μm and in which a vibration space is provided by digging down the support substrate 5 to a depth of 3 μm from the upper principal surface thereof, and is provided at such a position as to face the frame-shaped region 3B, the inner open holes 31, the inner beam portions 32, the outer open holes 33, and the outer beam portions 34 of the piezoelectric substrate 3. The vibration space communicates with the inner open holes 31 and the outer open holes 33 and prevents interference between the frame-shaped region 3B and the support substrate 5. The inner region 5A is a region having a diameter of 300 μm, and is a region which the inner region 3A of the piezoelectric substrate 3 overlaps. The outer region 5C is a region having an inner diameter of 600 μm, and is a region which the outer region 3C of the piezoelectric substrate 3 overlaps. By using, for the support substrate 5, a piezoelectric material that is the same as that for the piezoelectric substrate 3, the difference in linear expansion coefficient can be suppressed. It should be noted that Si or glass, which has a different thermal expansion coefficient from that of the piezoelectric substrate 3 but has excellent heat resistance, is easily available, and is inexpensive, may be used for the support substrate 5.

The upper principal surface electrode 2 includes eight drive detection electrodes 2A, eight circuit connection electrodes 2B, four reference potential connection electrodes 2C, and eight wirings 2D. The drive detection electrodes 2A are formed on the upper surface of the frame-shaped region 3B by patterning. The circuit connection electrodes 2B and the reference potential connection electrodes 2C are formed on the upper surface of the outer region 3C by patterning. The wirings 2D are provided so as to extend from the frame-shaped region 3B to the outer region 3C via the outer beam portions. Pairs of the drive detection electrodes 2A are located on both sides of the $X_1$ axis in the positive direction, on both sides of the $X_1$ axis in the negative direction, on both sides of the $X_2$ axis in the positive direction, and on both sides of the $X_2$ axis in the negative direction, at intervals of about 5 μm. Specifically, on the basis of the $X_2$ axis positive direction in the $X_1$-$X_2$ plane being 0', the drive detection electrodes 2A occupy ranges of about 0° to 30°, 60° to 90°, 90° to 120°, 150° to 180°, 180° to 210°, 240° to 270°, 270° to 300°, and 330° to 360°, respectively. It should be noted that the adjacent drive detection electrodes 2A are spaced apart from each other at an interval of about 5 μm. The circuit connection electrodes 2B are connected to a drive detection circuit described in detail below. The reference potential connection electrodes 2C are connected to the lower principal surface electrode 4 via through holes. The wirings 2D connect between the drive detection electrodes 2A and the circuit connection electrodes 2B and are joined to the piezoelectric substrate 3 via an insulating layer 2E.

In the above configuration, the drive detection electrodes 2A are provided on the upper principal surface of the frame-shaped region 3B of the piezoelectric substrate 3, and the lower principal surface electrode 4 and the support substrate 5 are laminated on the lower principal surface of the frame-shaped region 3B, to constitute a vibration portion. The vibration portion flexurally vibrates by a frequency signal being applied thereto.

Figure 4:
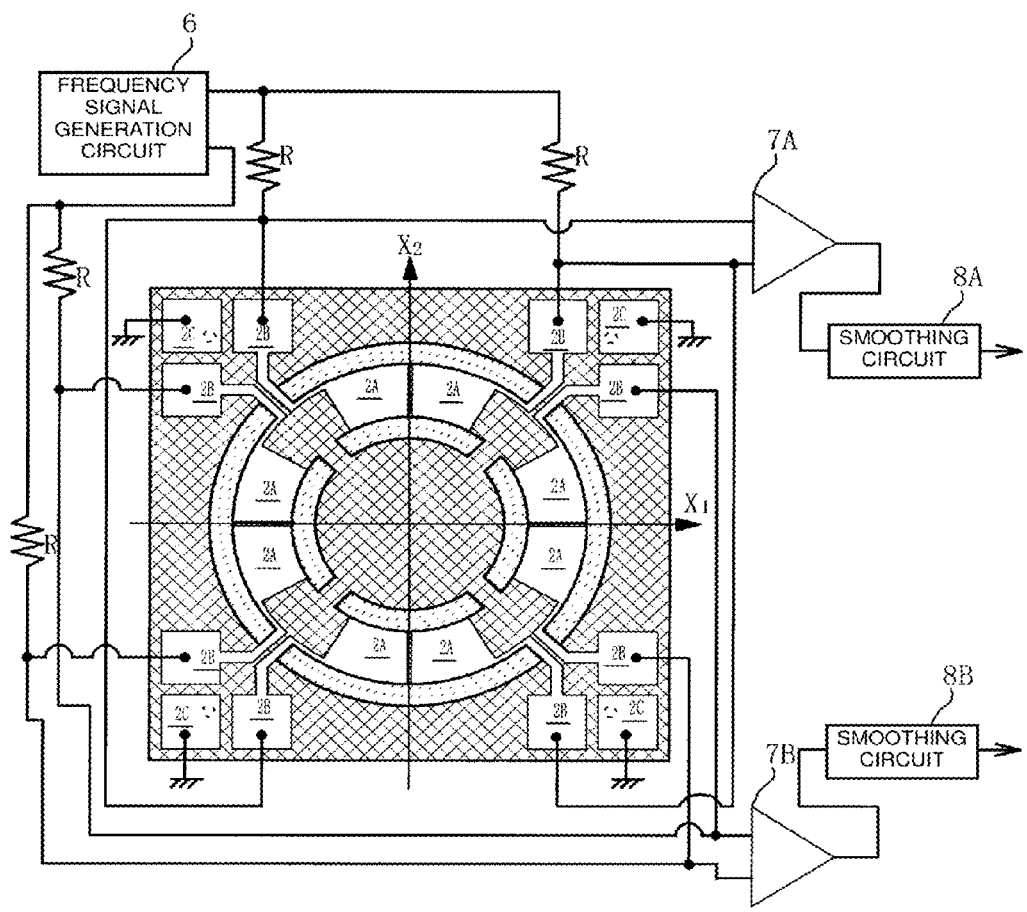
FIG. 4 is a diagram illustrating a circuit configuration of the vibration gyro element shown in FIG. 2.

FIG. 4 is a circuit diagram illustrating a circuit configuration example of the vibration gyro element 1. The vibration gyro element 1 includes a frequency signal generation circuit 6, differential circuits 7A and 7B, and smoothing circuits 8A and 8B. A ground is connected to the reference potential connection electrodes 2C.

The frequency signal generation circuit 6 is connected to the eight circuit connection electrodes 2B via driving resistors R and provides a frequency signal to each of the eight drive detection electrodes 2A. The frequency signal provided to each drive detection electrode 2A has the same phase and the same amplitude. In addition, its frequency is set to the resonant frequency of the frame-shaped region. In the resonant frequency, vibrations of the frame-shaped region 3B in the $X_3$ axis direction form the loops of the vibrations at positions (0°, 90°, 180°, and 270°) on the $X_1$ axis and the $X_2$ axis in the $X_1$-$X_2$ plane, and form the nodes of the vibrations at positions (45°, 135°, 225°, and 315°) supported by the beams.

Of the four drive detection electrodes 2A located on both sides of the $X_2$ axis, the two drive detection electrodes 2A located in the $X_1$ axis negative direction (on the left side in the drawing) are connected to a first input terminal of the differential circuit 7A. In addition, the two drive detection electrodes 2A located in the $X_1$ axis positive direction (on the right side in the drawing) are connected to a second input terminal of the differential circuit 7A. Further, of the four drive detection electrodes 2A located on both sides of the $X_1$ axis, the two drive detection electrodes 2A located in the $X_2$ axis negative direction (on the lower side) are connected to a first input terminal of the differential circuit 7B. The two drive detection electrodes 2A located in the $X_2$ axis positive direction (on the upper side) are connected to a second input terminal of the differential circuit 7B.

Output terminals of the differential circuits 7A and 7B are connected to the smoothing circuits 8A and 8B, and each of the differential circuits 7A and 7B outputs a voltage difference between the first input terminal and the second input terminal. The smoothing circuits 8A and 8B smooth the output voltages of the differential circuits 7A and 7B.

Figure 5A:
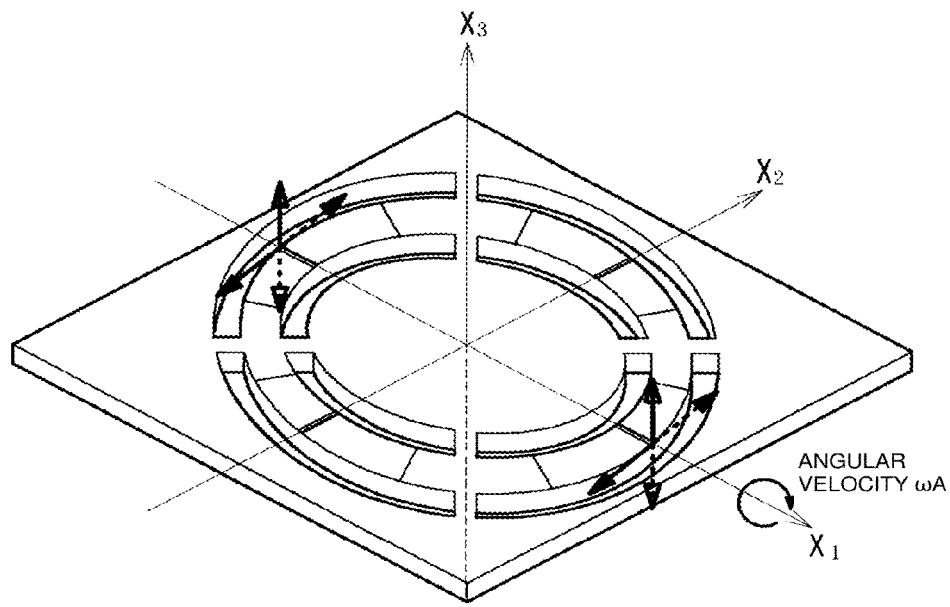
FIGS. 5(A) and 5(B) are diagrams illustrating an operation of the vibration gyro element shown in FIG. 2.
Figure 5B:
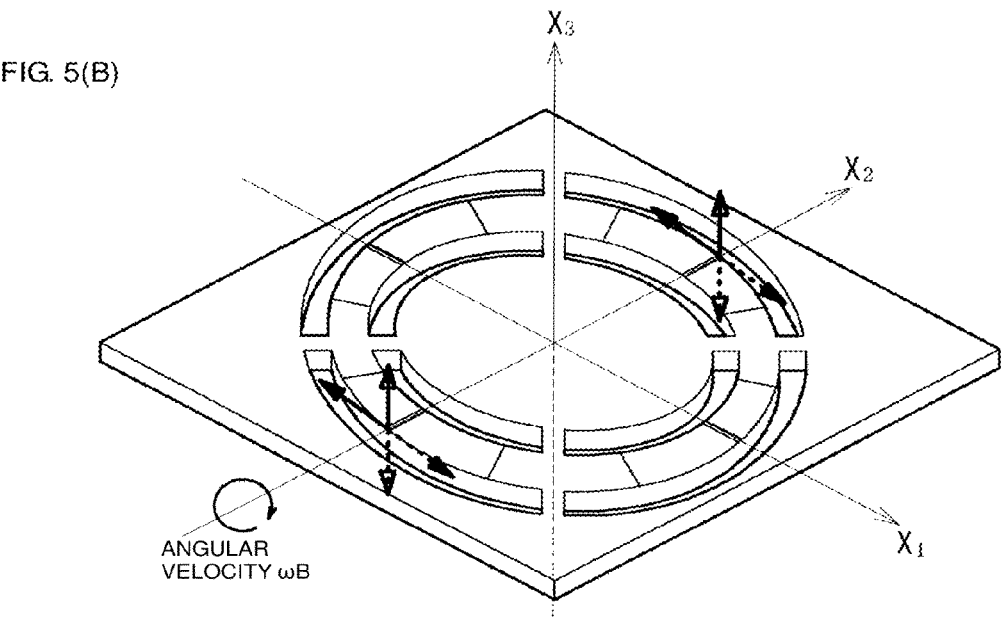

FIGS. 5(A) and 5(B) are diagrams illustrating an operation of the vibration gyro element 1. FIG. 5(A) illustrates an example where the vibration gyro element 1 rotates about the $X_1$ axis, and FIG. 5(B) illustrates an example where the vibration gyro element 1 rotates about the $X_2$ axis.

When flexurally vibrating with the resonant frequency, if an angular velocity about the $X_2$ axis is applied to the vibration gyro device, a Coriolis force is applied in the $X_1$ axis direction. Then, the phases of the frequency signals applied to the four drive detection electrodes 2A located on both sides of the $X_2$ axis change in directions opposite to each other between the drive detection electrodes 2A located in the $X_1$ axis positive direction and the drive detection electrodes 2A located in the $X_1$ axis negative direction. Thus, a differential output from the differential circuit 7A is a voltage corresponding to the magnitude of the Coriolis force.

Further, if an angular velocity about the $X_1$ axis is applied to the vibration gyro device, a Coriolis force is applied in the $X_2$ axis direction. Then, the phases of the frequency signals applied to the four drive detection electrodes 2A located on both sides of the $X_1$ axis change in directions opposite to each other between the drive detection electrodes 2A located in the $X_2$ axis positive direction and the drive detection electrodes 2A located in the $X_2$ axis negative direction. Thus, a differential output from the differential circuit 7B is a voltage corresponding to the magnitude of the Coriolis force.

It should be noted that in a state where the vibration gyro element 1 does not rotate, the frequency signals have the same phase and the same amplitude and thus are removed by the differential circuits 7A and 7B. In addition, a signal excited in each drive detection electrode when shock or the like is applied to the vibration gyro device, signals excited in the drive detection electrodes located along the $X_2$ axis during rotation about the $X_1$ axis, and signals excited in the drive detection electrodes located along the $X_1$ axis during rotation about $X_2$ axis, also have the same phase and the same amplitude and thus are removed by the differential circuits 7A and 7B.

Hereinafter, the linear expansion coefficient of the vibration gyro element will be described.

Figure 6A:
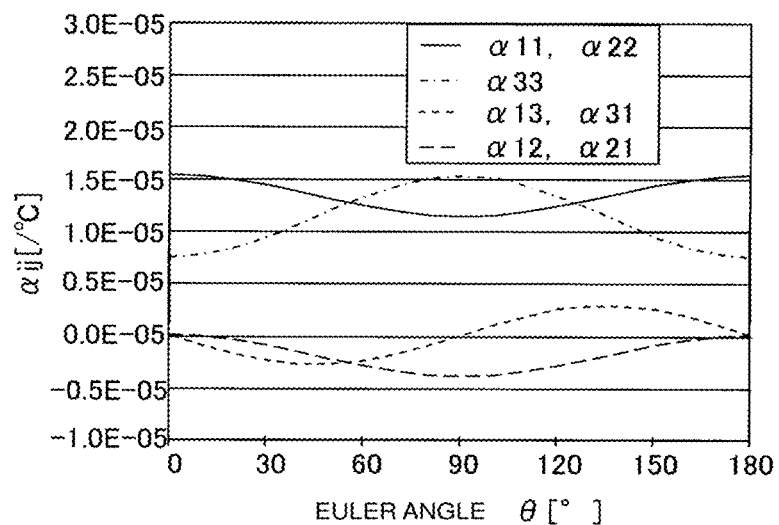
FIGS. 6(A) and 6(B) are diagrams illustrating in-plane rotation angle dependency of a linear expansion coefficient.

FIG. 6(A) is a diagram illustrating in-plane rotation angle dependency of the linear expansion coefficient in a piezoelectric monocrystal substrate of lithium niobate where ψ of the Euler angle=45°, namely, the relation between a matrix component obtained by transforming the linear expansion coefficient of the lithium niobate substrate according to the tensor transformation law and θ° of the Euler angle representation in the right-hand system. In the lithium niobate substrate, regardless of θ of the Euler angle, it is always satisfied that α11=α22 and α12=α21. This indicates that the linear expansion coefficients in the $X_1$ axis direction and the $X_2$ axis direction are equalized with each other and deformations with respect to these two axes due to temperature are made uniform with each other. Therefore, the distribution of distortion occurring on each detection axis in the piezoelectric substrate 3 or the support substrate 5 can have symmetry. Due to this, similarities of a driving characteristic and a detection characteristic based on each of the two detection axes can be ensured in a wide temperature range.

Figure 6B:
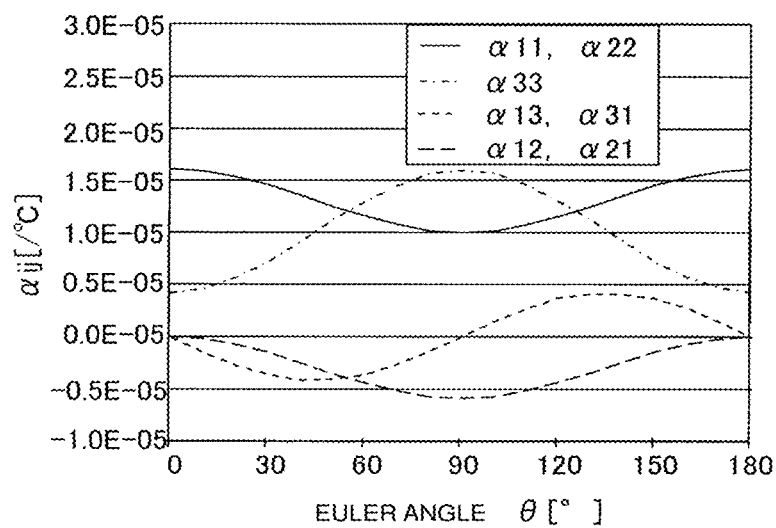

FIG. 6(B) is a diagram illustrating in-plane rotation angle dependency of the linear expansion coefficient in a piezoelectric monocrystal substrate of lithium tantalite where ψ of the Euler angle=45°, namely, the relation between a matrix component obtained by transforming the linear expansion coefficient of the lithium tantalite substrate according to the tensor transformation law and θ° of the Euler angle representation in the right-hand system. In this case as well, regardless of θ of the Euler angle, it is always satisfied that α11=α22 and α12=α21, the linear expansion coefficients in the $X_1$ axis direction and the $X_2$ axis direction are equalized with each other, and deformations with respect to these two axes due to temperature are made uniform with each other. Therefore, the distribution of distortion occurring on each detection axis in the piezoelectric substrate 3 or the support substrate 5 can have symmetry, and similarities of a driving characteristic and a detection characteristic based on each of the two detection axes can be ensured in a wide temperature range.

It should be noted that when a piezoelectric monocrystal substrate that is classified into the trigonal system 3m point group and has an Euler angle representation of (0°, θ°, 45°) in a right-hand system is used at least as the piezoelectric substrate 3, similarities of a driving characteristic and a detection characteristic based on each of two detection axes can be ensured in a wide temperature range similarly to the piezoelectric monocrystal substrates of lithium niobate and lithium tantalite. In addition, the support substrate 5 may be formed from any material. However, when a piezoelectric monocrystal substrate that is classified into the trigonal system 3m point group and has an Euler angle representation of (0°, θ°, 45°) in a right-hand system is also used as the support substrate 5, the similarities of the driving characteristic and the detection characteristic can be enhanced further.

Next, a preferable setting example of the Euler angle representation in the right-hand system in the piezoelectric substrate 3 will be described.

Figure 7A:
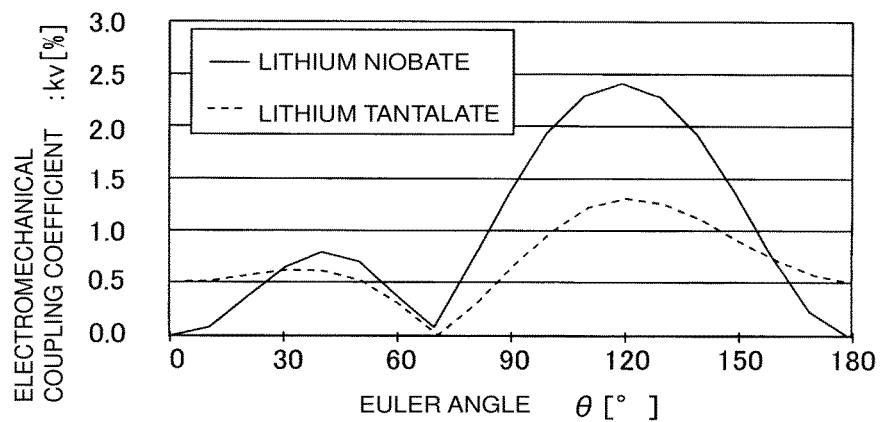
FIGS. 7(A) and 7(B) are diagrams illustrating the relation between θ of an Euler angle and an electromechanical coupling coefficient.

FIG. 7(A) is a diagram illustrating the relation between θ of an Euler angle and an electromechanical coupling coefficient in each of a lithium niobate substrate and a lithium tantalite substrate. The electromechanical coupling coefficient is defined as kv=(Cn/Cf)^(½) by conducting finite element method analysis in consideration of the material constants of the piezoelectric substrate 3, the upper principal surface electrode, the lower principal surface electrode, the dielectric layer, and the support substrate and the structure of the vibration body and using a free capacitance Cf and the equivalent capacitance Cn of a focused vibration mode. Specifically, the free capacitance Cf and the equivalent capacitance Cn between both terminals can be obtained by setting the lower electrode at 0 V and applying voltages of reversed polarities to a terminal connected in parallel to an electrode adjacent to the $X_1$ axis of the upper electrode and a terminal connected in parallel to an electrode adjacent to the $X_2$ axis, respectively.

As shown, when the Euler angle θ is changed from 0° to 180°, the electromechanical coupling coefficient of the lithium niobate substrate or the lithium tantalate substrate indicates a first maximum value at about θ=40°, indicates a minimum value at about θ=70°, and indicates a second maximum value at about θ=120°. The second maximum value of the electromechanical coupling coefficient is greater than the first maximum value of the electromechanical coupling coefficient. The sensitivity of the vibration gyro element 1 increases as the electromechanical coupling coefficient increases. Thus, it is preferred if θ of the Euler angle is set such that the electromechanical coupling coefficient of the piezoelectric substrate 3 is the second maximum value. Even when an error occurs in setting of θ of the Euler angle during a manufacturing process, since the rate of change of the electromechanical coupling coefficient is small around the second maximum value, variations of the electromechanical coupling coefficient and the sensitivity between each product are suppressed.

Figure 7B:
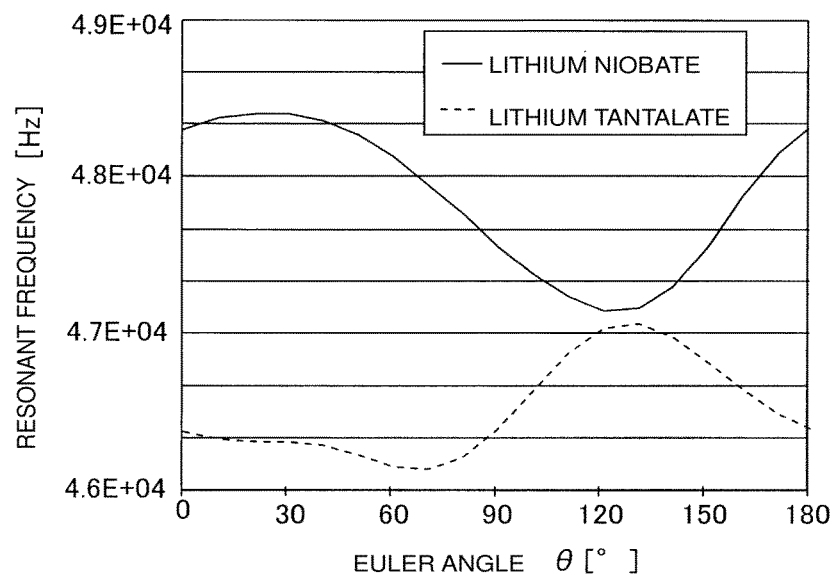

FIG. 7(B) is a diagram illustrating the relation between θ of the Euler angle and the resonant frequency of the lithium niobate substrate or the lithium tantalate substrate. The resonant frequency is obtained in consideration of the material constant of the piezoelectric substrate 3 and the structure of the vibration body.

As shown, when the Euler angle θ is changed from 0° to 180°, the resonant frequency of the lithium niobate substrate or the lithium tantalate substrate indicates an extreme at about θ=120°. Even when an error occurs in setting of θ of the Euler angle during a manufacturing process, since the rate of change of the resonant frequency is small around the extreme, variation of the sensitivity between each product is suppressed if θ of the Euler angle is set such that the resonant frequency of the piezoelectric substrate 3 is the extreme.

Figure 8A:
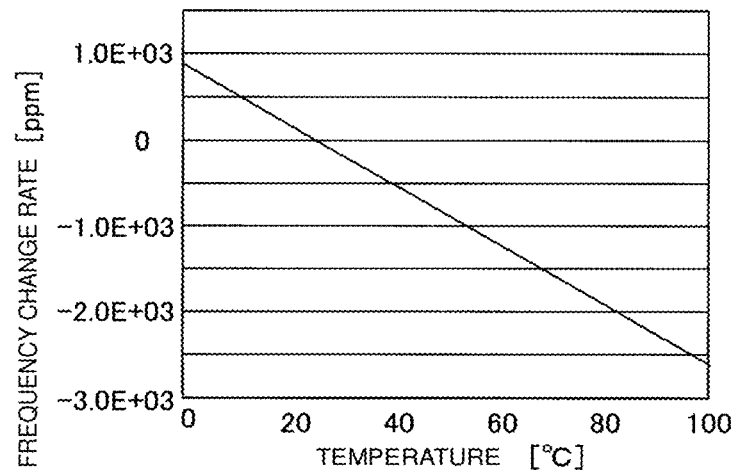
FIGS. 8(A) and 8(B) are diagrams illustrating the relation between temperature change and variation of a frequency change rate.
Figure 8B:
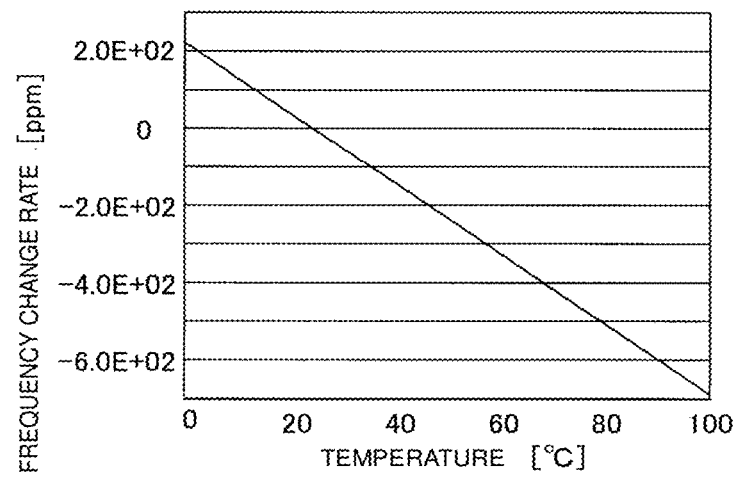

FIGS. 8(A) and 8(B) are diagrams illustrating the relation between: temperature change when the Euler angle representation in the right-hand system of the piezoelectric substrate 3 or the support substrate 5 is set as (0°, 120°, 45°); and variation of a frequency change rate based on 25° C. FIG. 8(A) illustrates an example where a lithium niobate substrate is used as the piezoelectric substrate 3, and FIG. 8(B) illustrates an example where a lithium tantalate substrate is used as the piezoelectric substrate 3. In the case of the lithium niobate substrate, the variation of the frequency change rate per temperature change of 1° C. is −35.1 ppm. Meanwhile, in the case of lithium tantalite, the variation of the frequency change rate per temperature change of 1° C. is −9.0 ppm. Due to this, in order to improve the temperature characteristic of the resonant frequency, it is desirable to use the lithium tantalate substrate rather than the lithium niobate substrate with which the electromechanical coupling coefficient and the Q value of the vibration body can be increased and an excellent sensitivity characteristic is obtained.

In the embodiment described above, the shape of the frame-shaped region is shown as a circular shape, but the present invention can be practiced even with various shapes such as a square, an elongated circle, a rectangle, and a polygon. In addition, either one of the inner region or the outer region of the piezoelectric substrate may be omitted, or both of them may be omitted.

REFERENCE SIGNS LIST 1 vibration gyro element
2 upper principal surface electrode
2A drive detection electrode
2B circuit connection electrode
2C reference potential connection electrode
2D wiring
2E insulating layer
3 piezoelectric substrate
31 inner open hole
32 inner beam portion
33 outer open hole
34 outer beam portion
3A inner region
3B frame-shaped region
3C outer region
4 lower principal surface electrode
5 support substrate
5A inner region
5B vibration region
5C outer region
6 frequency signal generation circuit
7A, 7B differential circuit
8A, 8B smoothing circuit

The invention claimed is:

1. A vibration gyro element comprising:
a piezoelectric substrate that is line-symmetrical about each of two detection axes, the detection axes being parallel to at least one of a first surface and a second surface of the piezoelectric substrate and orthogonal to each other; and
a plurality of pairs of electrodes provided on the first and the second surfaces of the piezoelectric substrate,
wherein the vibration gyro element is configured such that, when a frequency signal is applied between at least a first pair of the plurality of pairs of surface electrodes, the piezoelectric substrate vibrates in a direction normal to one of the first and second surfaces, a Coriolis force applied to the piezoelectric substrate by rotation about each detection axis is detected on the basis of a voltage excited in at least a second pair of the plurality of pairs of surface electrodes, and wherein
the piezoelectric substrate comprises a monocrystal classified into a trigonal system 3m point group, and a crystal axis X of a crystal coordinate system (X, Y, Z) coincides with any of axes each of which equally divides between two detection axes.

2. The vibration gyro element according to claim 1, further comprising a support substrate comprising a monocrystal classified into the trigonal system 3m point group, in which the crystal axis X of the crystal coordinate system (X, Y, Z) coincides with the axis that equally divides between the two detection axes, and which supports the piezoelectric substrate.

3. The vibration gyro element according to claim 1, wherein the piezoelectric substrate includes a frame-shaped vibration portion and a support beam which supports the vibration portion, and the support beam is provided so as to extend along one of the axes that equally divides between the two detection axes.

4. The vibration gyro element according to claim 3, wherein the piezoelectric substrate:
has a characteristic in which, when θ of an Euler angle representation in a right-hand system is changed from 0° to 180°, an electromechanical coupling coefficient changes to a first maximum value, a minimum value, and a second maximum value in order, and the second maximum value is greater than the first maximum value; and
is configured such that θ of the Euler angle representation in the right-hand system falls within a range where the electromechanical coupling coefficient is greater than the first maximum value.

5. The vibration gyro element according to claim 4, wherein the θ of the Euler angle representation in the right-hand system is in a range where the electromechanical coupling coefficient is substantially the second maximum value.

6. The vibration gyro element according to claim 3, wherein the piezoelectric substrate has a characteristic in which, when θ of an Euler angle representation in a right-hand system is changed from 0° to 180°, a resonant frequency indicates an extreme and changes, and the piezoelectric substrate is configured such that the θ of the Euler angle representation in the right-hand system falls within a range where a resonant frequency is substantially the extreme.

7. The vibration gyro element according to claim 1, wherein the piezoelectric substrate comprises lithium niobate or lithium tantalate.

* * * * *